United States Patent [19]

Cardwell et al.

[11] 3,894,139
[45] July 8, 1975

[54] NICKEL-COBALT SEPARATION FROM AQUEOUS SOLUTIONS

[75] Inventors: Paul H. Cardwell, Zanoni; William S. Kane, Wicomico; James A. Olander, Gloucester Point, all of Va.

[73] Assignee: Deepsea Ventures, Inc., Gloucester Point, Va.

[22] Filed: Feb. 28, 1973

[21] Appl. No.: 336,737

Related U.S. Application Data

[63] Continuation-in-part of Ser. No. 247,692, April 26, 1972.

[52] U.S. Cl. .................. 423/24; 423/318; 423/49; 423/139; 423/150; 75/101 BE; 75/111; 75/114
[51] Int. Cl.... C01g 3/00; C01g 45/00; C01g 51/00; C01g 53/00; C22b 3/00; C22b 15/00; C22b 23/00
[58] Field of Search ............. 423/49, 139, 138, 150, 423/24; 75/101 BE, 117, 119

[56] References Cited
UNITED STATES PATENTS

2,766,115  10/1956  Graham et al. .................. 75/114 X
3,128,156  4/1964   Song et al. ....................... 75/101 BE
3,224,873  12/1965  Swanson ........................... 75/101 BE
3,276,863  10/1966  Drolinick et al. ................. 423/139
3,455,680  7/1969   Ashbrook et al. ................. 75/119 X
3,703,573  11/1972  Blytas ............................. 75/119 X Primary Examiner—Oscar R. Vertiz
Assistant Examiner—Brian E. Hearn
Attorney, Agent, or Firm—Barry G. Magidoff

[57] ABSTRACT

This invention provides a process for obtaining separate solutions of a soluble nickel salt and a soluble cobalt salt from a pregnant aqueous solution comprising a mixture of a cobalt salt and a nickel salt. The nickel and cobalt are extracted together from the pregnant solution by a liquid ion exchange extraction medium and then selectively stripped from the extract. The pregnant aqueous solution can be derived from the leaching of various ores, such as ocean floor nodule ore, or from, e.g., spent electroplating solutions or spent acid pickling liquors, containing nickel and cobalt.

25 Claims, 2 Drawing Figures

NICKEL-COBALT SEPARATION FROM AQUEOUS SOLUTIONS

This application is a continuation in part of copending application Ser. No. 247,692, filed Apr. 26, 1972.

With the development of the so-called chelates, or liquid ion exchange reagents, hydrometallurgy has become an increasingly important procedure in the refining of the relatively more precious non-ferrous metals, especially metals such as nickel, cobalt, copper and manganese. The basis for these procedures is the fact that the chelates, or liquid ion exchange reagents, are or can be made, selective for one or more of the desired metal values in a solution of a mixture of metal values. Useful liquid ion exchange reagents include certain organic phosphoric acid compounds, such as the dialkyl phosphoric acids disclosed by Olsen et al in U.S. Pat. No. 3,104,971, and the alpha-hydroxyoximes described in several patents to Swanson, for example, U.S. Pat. No. 3,224,873. Amongst the most recently developed chelating, or liquid ion exchange, reagents are the substituted hydroxyquinolines which were developed apparently initially by Budde Jr., et al and are disclosed in published South African Specification No. 69/4397.

A major problem in the hydrometallurgical field, and one which is especially significant commercially is the difficulty of separating cobalt value from nickel value and both from other metal values in aqueous solutions. Although separation schemes have been proposed where cobalt has been extracted preferentially from a solution comprising nickel and cobalt, the separation of the two metals is incomplete.

It is very common to treat ores containing both nickel and cobalt in economicallly useful proportions. For example laterite ores, e.g. the Nicaro (Cuba) deposit contains limonite ore and metal values in the following percentages by wt., nickel-1.3%, cobalt-0.12%, chromium -2.4% and iron-50%; serpentine ore contains 15% iron, 1.6% nickel, 0.07% cobalt and 1% chromium. Other nickel-cobalt ores are found in West Irian, Indonesia; the Cykloop deposit contains 1.1% nickel and 0.15% cobalt, and the Waigeo deposit contains 1.4% nickel and 0.15% cobalt.

One type of ore for which selective extraction procedures have been found extremely useful, has been the so-called ocean floor nodule ores. These nodule ores are treated in various ways and then leached to form an aqueous solution of the metal values from the nodule ores. The ocean floor nodule ores generate aqueous solutions comprising primarily manganese values and secondarily copper, cobalt and nickel values plus relatively small or trace quantities of a large number of other metal values.

The particular combination of metal values resulting from the treating and leaching of the ocean floor nodule ores is unique in hydrometallurgy. As a result, many procedures utilized for the separation of metal salts during the refining of other, land-derived, ores are not directly applicable.

The higher proportion of manganese, together with the presence of significant quantities of copper, cobalt and nickel, combine to render the separation of these metal values extremely difficult. For a specific analysis of the ocean floor nodule ores, see, for example, an article entitled "The Geochemistry of Manganese Nodules and Associated Deposits from the Pacific and Indian Oceans," by Croonan and Tooms in Deepsea Research, (1969) Vol. 16, pages 335 to 359, published by Pergamon Press (Great Britain).

Orlandini, in U.S. Pat. No. 3,479,378, discloses a liquid ion exchange method for separating metal values from aqueous solutions of salts of copper, zinc, manganese, cobalt and nickel. The nickel and cobalt extracting agent is an alpha-hydroxyoxime, and a dialkyl phosphoric acid is suggested for use in the extraction of zinc and/or copper. Orlandini indicated that about 80% of the cobalt can be extracted in the first extraction stage. Orlandini, however, requires a pH of about 6 in order to extract the cobalt from the aqueous solution. This is a value sufficiently high to provoke the precipitation of manganese from an aqueous solution if manganese is present in the amounts, for example, which are obtained from ocean floor nodule ores. Further, Orlandini does not disclose a method for stripping the cobalt from the oxime extractant.

Ashbrook, in U.S. Pat. No. 3,455,680, also discloses the use of a mixture of an alpha-hydroxyoxime and di-(2-ethylhexyl) phosphoric acid to separate nickel from cobalt and copper salts in mixed solution. Ashbrook initially removes copper utilizing the alpha-hydroxyoxime extractant and then at a different pH extracts cobalt from the copper raffinate aqueous solution. Ashbrook admits that in order to reduce the nickel level in the extract to 1%, the cobalt recovery would be decreased to only 50%. Ashbrook suggests that the cobalt can be readily stripped from the organic extract solution with 10% $HNO_3$. Any nickel would be also stripped with the cobalt. This results in the nitrate salt of cobalt, in aqueous solution, which can be calcined to produce cobalt oxide. There is no suggestion that any other type of stripping solution can be utilized.

For many purposes it is desirable to obtain the metal salts in their halide form as this is often a form most readily reduced by, for example, electrolysis.

Solid chelating agents have also been utilized as the extractants for separating nickel, copper and cobalt values from aqueous solution. See, for example, U.S. Pat. Nos. 3,003,866 and 3,082,081. Naphthenic acid has been suggested as an extractant for certain purposes, e.g., see U.S. Pat. No. 3,374,090.

The present invention permits the separation of nickel and cobalt values from aqueous solutions to obtain an aqueous solution of the salt of an individual metal value, and specifically the preparation of an aqueous solution of cobalt halide from an aqueous solution containing cobalt and nickel and optionally also containing manganese in relatively large proportions and small amounts of a wide range of other metals.

In accordance with the present invention individual aqueous solutions of cobalt halide and of a salt of nickel, respectively, can be obtained from a pregnant aqueous solution comprising the salts of nickel and cobalt by a process comprising, 1) maintaining the pH of the pregnant aqueous solution at a value of at least about 3; 2) contacting the pregnant aqueous solution with a water-immiscible liquid ion exchange extracting medium, the medium comprising an extracting agent designed and adapted to extract nickel and cobalt together from the pregnant solution, while maintaining the pH of the aqueous solution within the desired range until the aqueous solution is substantially depleted in nickel and cobalt, thus forming an organic extract containing the nickel and cobalt values and an aqueous raffinate substantially depleted in nickel and cobalt; 3) selectively stripping the nickel value from the organic extract with an acidic aqueous solution to form an organic phase substantially depleted of nickel and an aqueous phase containing a nickel salt; 4) stripping the cobalt value from the organic phase preferably using an aqueous acid solution containing a hydrogen ion concentration and a halide ion concentration of at least 6 Normal each to form an organic phase substantially depleted in nickel and cobalt values and an acidic aqueous phase containing a cobalt halide.

Preferably, in order to conserve the strong acid value in the cobalt stripping solution, it is preferred to contact the highly acidic stripping material containing the 6N hydrogen and chloride ion concentration with an extracting agent which is capable of extracting the cobalt halide from the acid solution and from which the cobalt halide can be readily stripped utilizing an aqueous solution.

Generally, the nickel and cobalt can be extracted from the pregnant aqueous solution if the solution is maintained at a pH of from about 3 to about 7. Preferably, the pH of the aqueous solution is maintained at from about 3.5 to about 5, with the best results being obtained at a pH of from about 3.5 to about 4.5. Operating at too high a pH can result in the precipitation of other metal values which may be present, or of nickel and cobalt.

The maximum pH permissible for a given pregnant aqueous solution is determined by the other metal values which may be present. It is preferred to avoid precipitating any metal salts. At the least, this would require an additional liquid-solid separation step, e.g., filtration, to remove the precipitate. The precipitate could be a gel-like material, that forms an emulsion which can be separated, if at all, only with great difficulty. This often happens, if, for example, manganese is present and the pH is raised to above 6.

The extraction of nickel begins at a pH of about 3, when using the liquid ion exchange agents described below. Cobalt is not extracted until a pH of at least about 3.5 is reached in the aqueous solution. Generally, by varying the pH, the proportion of nickel and cobalt extracted can be varied: increasing pH increases the proportion of cobalt extracted, decreasing pH, to a minimum of 3, increases the proportion of nickel extracted. Therefore, the extraction can take place in two separate stages, e.g., the first at a pH of from about 3 to about 3.5 to extract most of the nickel, and the second at above about 3.5 to extract most of the cobalt.

If a single system is preferred, an average pH should be maintained, at which average value the extractant removes nickel and cobalt in the proportion they are present in the pregnant aqueous solution. This average value can be readily determined empirically for the particular extracting agent to be used for any given aqueous solution.

For example, when the extracting agent is 7-[3-(5,5,7,7-tetramethyl-1-octenyl)] 8-hydroxyquinoline, the following data have been obtained, from the extraction of an aqueous solution containing nickel chloride, (2.94 grams per liter as nickel) and cobalt chloride (0.565 grams per liter as cobalt). The solution was extracted with a 10% solution of the 8-hydroxyquinoline in a kerosene solvent (Napoleum) at a ratio of one volume of organic to two volumes of aqueous phase. The extraction factors $E_{metal}$ were determined as shown in Table I:

$$\frac{\text{Weight of metal in organic phase}}{\text{Weight of metal in aqueous phase}} = E_{metal}$$

Table I

| pH | $E_{Ni}$ | $E_{Co}$ | $E_{Co}/E_{Ni}$ |
|---|---|---|---|
| 7.1 | 3.7 | 11.1 | 3.0 |
| 6.3 | 7.25 | 13.0 | 1.8 |
| 5.6 | 6.52 | 8.2 | 1.25 |
| 4.0 | 1.84 | 0.16 | 0.08 |

Figure 2:
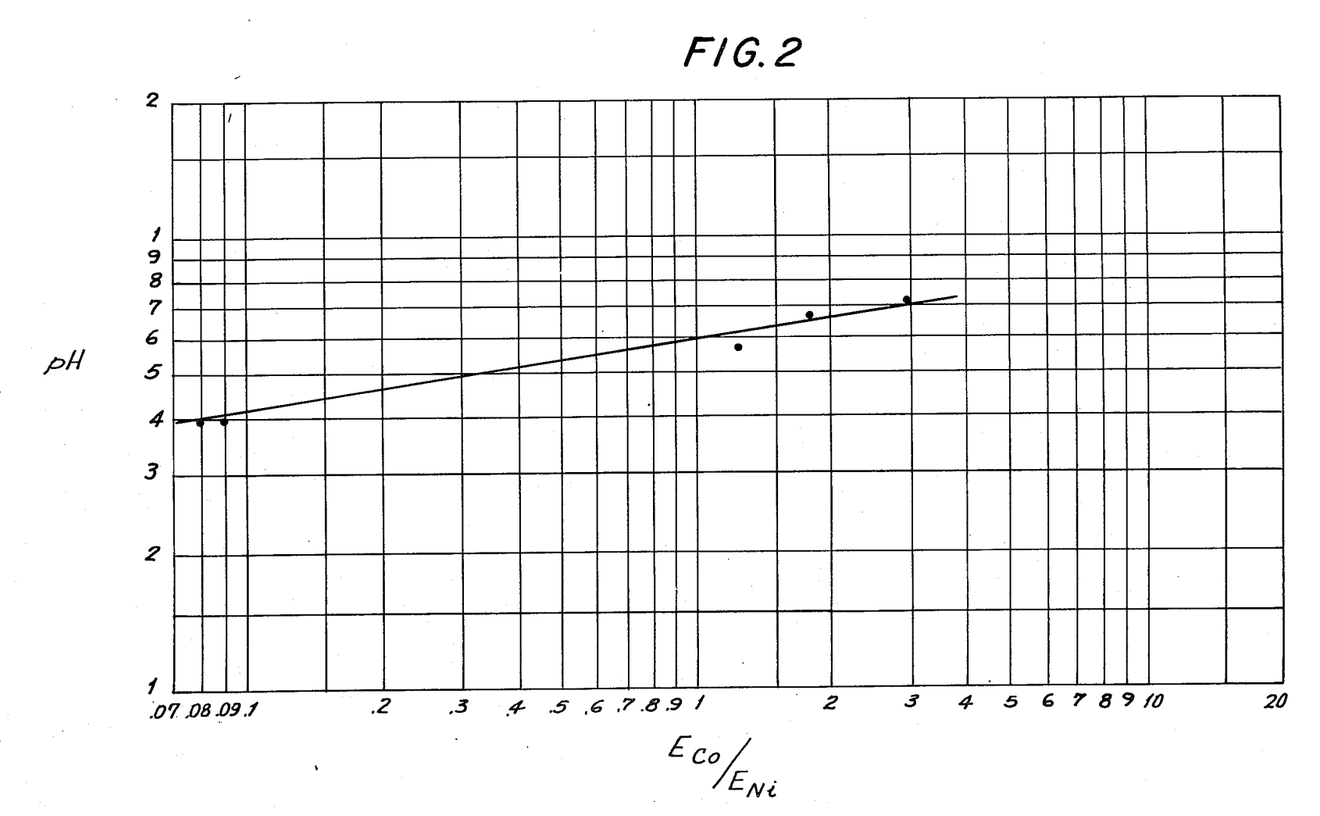
FIG. 2 is a log-log graph showing the change in the proportion of nickel and cobalt extracted from an aqueous solution with change in the pH of the aqueous solution using as the extracting agent 7-[3-(5,5,7,7-tetramethyl-1-octenyl)] 8-hydroxyquinoline.

The above data can be used to determine the optimum pH to extract the proper ratio of nickel and cobalt values from aqueous solutions having widely different proportions of these two metal values present. Such charts can be readily prepared for any extracting agent desired to be used. The above results are plotted on a log-log graph in FIG. 2.

It is further preferred that certain metal values not be present in the aqueous solution or that they be removed before this process is initiated. For example, if an aqueous solution to be treated in accordance with this invention has a pH of less than about 2.5, it is advisable to remove any dissolved ferric iron or cupric copper values before increasing the pH to 3 or higher. Iron or copper values form precipitates at higher pH's which are very difficult to separate out and which interfere with proper phase separation during the liquid ion exchange stages of this process. Generally, it is to be understood, that the pregnant aqueous solution is to be substantially free of any material which would interfere with the process of this invention. Such materials include cupric copper, ferric iron and aluminum.

In order to maintain the pH in the desired range during the extraction procedure, it is generally necessary to add a basic reagent. The chelating agents act by releasing hydrogen ions when extracting metals, and thus the pH would tend to decrease during extractng unless a basic reagent is added. Caustic soda solution is preferably used; the sodium ion does not interfere with the further processing of any metal salt and the caustic soda is not especially expensive. However, other basic reagents can be used including alkali metal oxides and hydroxides, alkaline earth metal hydroxides and oxides, and the corresponding carbonates of the alkali metals and alkaline earth metals. Examples of such materials include calcium hydroxide, potassium hydroxide, lithium hydroxide, lithium carbonate, magnesium carbonate, calcium carbonate, ammonium hydroxide, and ammonium carbonate. In addition, hydroxides of other metals which are normally present in the aqueous solution and which will not interfere with any further required process of the solution can be utilized.

Generally, a relatively weakly acidic aqueous solution can be used to selectively strip nickel from the organic extract following the extraction of the nickel and cobalt from the aqueous solution. It is only necessary that the total amount of hydrogen ion (H+) present in the total stripping liquid must be sufficient to displace the nickel in the organic extract.

For example, weakly acidic solutions of the mineral acids or the stronger organic acids (such as chloracetic acid) in concentrations of as little as about 0.1 Normal hydrogen ion, can be utilized. The concentration of hydrogen ion is preferably less than 6 Normal, especially where chloride ion is present, to avoid stripping of cobalt. Preferably, the concentration of hydrogen ion is from about 0.1 Normal to about 3 Normal except with nitric acid; optimum results, based upon the economy of utilizing a weak acid, are obtained with acidic solutions of from about 0.1 Normal to about 1 Normal hydrogen ion. Useful stripping acids include, for example, sulfuric acid, nitric acid, chloracetic acid, hydrochloric acid, hydrobromic acid and hydroiodic acid, depending upon the nickel salt which is desired.

Cobalt can be stripped from the organic extract by preferably using a strong mineral acid aqueous solution having a concentration of at least 6 Normal in hydrogen ion and 6 Normal in chloride ion. Concentrated hydrochloric acid, containing at least 20% by weight HCl is preferred.

The preferred liquid ion exchange agents for extracting the cobalt and nickel values from the aqueous solutions are known as chelates, and thus remove only the metal values from the solution leaving behind the anions. Generally, the anions in the aqueous solution have substantially no effect on the extraction procedure and any salt of nickel and cobalt, or of any of the other metal values, can be present in the solution. The only caveat is that the anions must be inert to, or substantially nonreactive with, the chelate and not interfere with the chelation or extraction of the metal value. For example, if the anion portion tends to complex with either the metal or the chelate, there may be some interference preventing complete separation of the nickel and cobalt from the aqueous solution.

Preferred liquid ion exchange extracting agents useful in the present procedure include the substituted 8-hydroxyquinolines and alpha-hydroxyoximes.

The 8-hydroxyquinoline compounds, which are especially useful for the separation of the metal values in accordance with the present process, can generally be defined by the following formula:

I.

wherein each of the R groups can be hydrogen or a hydrocarbyl group or inertly substituted hydrocarbon groups, such as alkenyl, alkyl, alkynyl, cycloalkyl, cycloalkenyl, aryl or combinations thereof, such as alklyl, aralkyl, aralkenyl, alkylcycloalkyl, etc.

At least one of the R groups, however, must be a hydrocarbon group. Any inert substituent can be present, as long as it does not adversely affect the solubility of the substituted 8-hydroxyquinolines in organic solvents nor adversely affect the solubility in the organic solvent of the metal chelate formed therefrom.

The resulting metal chelate must remain soluble at least to the extent of approximately 2% by weight in the organic solvent.

The preferred position of the hydrocarbyl substituent of the 8-hydroxyquinoline nuclear structure is such as to preferentially complex with the desired metal ion in the aqueous solution. The sum of the carbon atoms in the R groups must be at least about 8 and can be high as 24 or more. The preferred R groups are alkylbenzyl groups or beta-alkenyl groups containing from 12 to 18 carbon atoms, preferably attached at the $R^5$, $R^6$, or $R^7$ position. The optimum position for substitution is at the $R^7$ position to obtain the highest degree of efficiency. For a more complete description of these hydrocarbyl-substituted 8-hydroxyquinolines, see Republic of South Africa specification No. 69/4397 to Budde Jr. et al, assigned to Ashland Oil, Inc.

Representative compounds useful for ion exchange and within the scope of the above general formula I are: 7-octyl-benzyl-8-hydroxyquinoline, 7-dodecylbenzyl-8-hydroxyquinoline, 7-nonylbenzyl-8-hydroxyquinoline, 7-ditertiarybutylbenzyl-8-hydroxyquinoline, 7-hexadecenyl-8-hydroxyquinoline, 7-dibenzyl-8-hydroxyquinoline, 7-dimethyldicyclopentadienyl-8-hydroxyquinoline, 7-dicyclopentadienyl-8-hydroxyquinoline, 7-dodecylphenyl-8-hydroxyquinoline, 7-phenyldodecenyl-8-hydroxyquinoline, and the like where one or more of the hydrocarbyl groups R are attached to ring carbon atoms in the 2nd, 3rd, 4th, 5th and 6th positions. Mixtures of these 8-hydroxyquinoline derivatives can be used if desired.

The second preferred type of extracting agents are the hydroxy oximes, which are disclosed inter alia in U.S. Pat. Nos. 3,224,873; 3,276,863 and 3,479,378. These materials have the general formula:

wherein the $R^a$, $R^b$, and $R^c$ groups can be any of a variety of organic, hydrocarbon radicals such as aliphatic and alkyl-aryl radicals. $R^b$ can also be hydrogen. Preferably $R^a$ and $R^c$ are unsaturated hydrocarbon or branched chain alkyl groups containing from about 6 to about 20 carbon atoms. $R^a$ and $R^c$ are also preferably the same, and when alkyl are preferably linked to the central carbon atoms by a secondary carbon atom. $R^b$ is preferably hydrogen or unsaturated hydrocarbon or branched chain alkyl group containing from about 6 to about 20 carbon atoms. The oxime preferably contains a total of from about 14 to about 40 carbon atoms. Useful $R^a$, $R^b$ and $R^c$ groups include in addition to hydrogen, the mono- and poly-unsaturated groups such as heptenyl, octenyl, decenyl, octadecenyl, octadecynyl, and 2-ethyl-octadecenyl.

Alkyl groups include 2-ethylhexyl, 2,3-diethylheptyl, 2butyldecyl, 2-butylhexadecyl, 2,4-ethylbutyldodecyl, 4-butylcyclohexyl, and the like. Examples of the preferred alpha hydroxy oximes include 19-hydroxyhexatriaconta-9, 27-dien-18-oxime; 5,10-diethyl-8-hydroxytetradecan-7-oxime; 5,8-diethyl-7-hydroxydodecane-6-oxime.

The extracting medium should be immiscible with water or otherwise readily separable from aqueous solutions, in order to improve the economic efficiency of the process. If the extracting medium were not readily separable from the water, or aqueous solution, a substantial loss of the extracting reagent would occur during such extraction, i.e., there would be at least a partial solubility in the aqueous phase and a loss of the extracting agent in the aqueous raffinate. Therefore, generally, immiscible extracting mediums are utilized. The extracting agent can be itself a liquid which is completely immiscible with water, or aqueous solutions, or as is commonly the case, the extracting agent is dissolved in a solvent for the extracting agent which is substantially immiscible with water, to form a water-immiscible extracting medium.

It has been found when utilizing the commercially available alpha-hydroxyoximes or 8-hydroxyquinolines that they can be dissolved into solutions containing from about 2 to about 50% and preferably from about 5 to about 30% by weight of the extracting agent and remain economically useful and sufficiently active to remove the nickel and/or cobalt values from the aqueous solution while being sufficiently dilute so that substantially no extracting agent is leached and lost in the aqueous raffinate. If it is desired, however, more concentrated solutions can be utilized. Mixtures of extracting agents can be used as long as they are not jointly reactive and do not interfere with the process of this invention.

Such solvents include generally any inert hydrocarbons which are solvents for the extracting agent, per se, and for the metal-extracting agent complex, and which do not react with any of the other materials present under the conditions of the extraction process. Generally, liquid aliphatic, cycloaliphatic, aromatic, cycloaliphatic-aromatic, aliphatic-aromatic or chlorinated such hydrocarbons are preferably utilized as the solvents for the metal-extracting medium. Optimally, the solvent has a specific gravity in the range of from about 0.65 to about 0.95 and a mid-boiling point in the range of from about 120° to 615°F. (ASTM distillation). However, substantially any liquid can be used as a solvent-diluent that meets the following criteria:

1. A solvent for the extracting agent;
2. A solvent for the extracting agent-metal complex;
3. Immiscible with water; and
4. Readily separable from water.

Examples of suitable solvents include benzene, toluene, xylene, aliphatic and aromatic petroleum fractions such as naphtha and derivatives thereof and mixtures of the foregoing. In addition to the aliphatic, aromatic, cycloaliphatic-aromatic, aliphatic-aromatic hydrocarbons and cycloaliphatic hydrocarbons, chlorinated such hydrocarbon liquids can also be usefully utilized.

Light fuel oil, high flash point kerosene and other petroleum hydrocarbons, such as hexane-heptane mixtures are preferred. Generally, the aliphatic materials are most preferred because of their ready availability and ease of separation from the aqueous phase.

The concentration of the extracting agent in the solvent is determined not only by the solubility of the extracting agent per se, but also by the solubility of the extracting agent-metal complex.

In addition to the solvent and the extracting agent, there can preferably also be present in the extracting medium a phase modifier which prevents formation of an emulsion with, or entrainment of, the organic phase in the aqueous phase. This is accomplished, it is believed, by altering the interfacial tension and related physical properties of the organic-aqueous mixture during extraction. These phase modifiers are generally most useful when an aliphatic solvent is utilized and include, preferably, aliphatic alcohols containing from about 8 to about 16 carbon atoms, such as n-octyl alcohol, n-decyl alcohol, n-dodecyl alcohol, n-tetradecyl alcohol, n-hexadecyl alcohol, isooctyl alcohol, 2-ethylhexyl alcohol, cyclohexanol and mixtures of these and other alcohols. Decanol is a preferred material.

Generally no more than the necessary amount of the phase modifier, e.g., alcohol, which is necessary to inhibit the formation of the emulsion or prevent entrainment, should be used. Usually no more than about 25% by volume of the phase modifier is necessary. Preferably, from about 2 to about 10% by volume is satisfactory and not more than about 5% is most preferred. The phase modifier can be completely eliminated if desired, and, therefore, is optional in the present procedure.

When utilizing liquid-liquid extraction from an aqueous solution of mixed metal values, a wide range of aqueous phase-to-aqueous-immiscible-phase volume ratio can be utilized in the present invention. Generally, using a 20% by wt. solution of an oxime or hydroxyquinoline, aqueous-immiscible/aqueous phase volume ratios of from about 10:1 to about 1:10 are desirable.

The extracting steps and the stripping steps in the present process are preferably carried out by liquid-liquid contact utilizing any conventional liquid-liquid contact apparatus. The procedure can be carried out in a single stage batch operation or in a continuous flow unit. Preferably, in a continuous unit, the flow of the two phases is counter-current, such as in a continuous countercurrent mixer-settler unit, or in a pulse column.

Useful apparatus in addition to mixer-settler units and pulse columns include, for example, packed and plate-type towers, and baffled towers, preferably, operated countercurrently.

The number of stages can be varied, as required, based on the efficiency of extraction and stripping of the specific materials being treated and of the apparatus being utilized. By adjusting the relative volumes of the aqueous mixed metal salt solution and of the water-immiscible extracting medium, it is possible to obtain substantially complete extraction of the metal values from the aqueous solution into the extracting medium. Similarly, by adjusting the ratio of the extract phase to the aqueous stripping liquid, substantially complete stripping of the metal values from the extract phase into the stripping liquid can also be obtained. It is recognized that in continuous operation there is a residual cobalt metal value remaining in the extracting medium following stripping. The extracting medium containing this residual cobalt value can be recycled for further extraction use.

The phase volume ratio for the stripping procedure, i.e., aqueous stripping liquid-to-water-immiscible extracting medium is preferably in the range of from about 10:1 to about 1:10.

The extracting agent for removing the cobalt from the highly acidic stripping solution can be any material which can remove cobalt value from aqueous solution containing high concentration of halide ion. The cobalt value can be extracted as the bare cobalt ion, e.g., by the use of a chelate extractant; preferably, however, the cobalt value is extracted as a halide, generally as a halide complex ion. Generally, the cobalt in the highly acid aqueous stripping solution is in the form of a halide complex, e.g., cobalt tetrachloride ion. Materials which are capable of extracting cobalt halide are the trihydrocarbyl amines, such as tri(aryl)amines, tri(alkyl)amines or tri(alkyl)(aryl) amines including the tri-(cycloalkyl) amines. The tri-(alkyl) amines are preferred and include alkyl groups having from about 5 to about 15 carbon atoms and optimally from about 8 to about 10 carbon atoms. Although both normal and branched chain alkyl groups can be utilized preferably branched chain groups are used. Examples of the useful tri-alkyl amines include tri-(isooctyl) amine, tri-(n-octyl) amine, di-(isooctyl)(n-hexyl) amine, di-(n-octyl)(n-hexyl) amine, tri-(2-ethylbutyl) amine, tri-(2-ethylhexyl) amine, di-(n-octyl)(n-decyl) amine, di-(n-decyl)(n-octyl) amine and tri-(n-decyl) amine.

The above-described amine extracting agents are also generally dissolved in an organic water-immiscible solvent, of the type described above for use with the oxime and hydroxyquinoline extracting agents. The amines are generally soluble to an extent that the usual concentration of the amines in the solution is from 2 to about 50% by weight of the total solution, but preferably, not more than about 15% by weight.

A phase modifier can be present as is described above for the chelating agents.

The cobalt halide laden extract is preferably stripped of the cobalt halide using an acid aqueous solution free from anions which will cause the precipitation of cobalt.

As pointed out above, the process according to the present invention is especially applicable to the separation of aqueous solutions derived from the refining of ocean floor nodule ores. Such ores are initially reacted with a reagent to prepare water-soluble salts of the metal values present in the ore, and the salts can then be leached into aqueous solutions. The initial reagents include those which result in the formation of the sulfate salts of the metals, e.g., sulfur dioxide plus oxygen, as well as those which result in the halide salts of the metal values, e.g., hydrogen halide, elemental halogen, and molten alkali metal halides or molten alkaline earth metal halides. In each case, the salts can be leached by various means to form an aqueous solution comprising nickel and cobalt salts, as well as salts of copper and large amounts of manganese and smaller amounts of other metal salts. In addition, depending upon the procedure utilized for initially reacting the ore, iron salt can also be present in the initial solution. For a more complete exposition on the procedure for initially reacting the ocean floor nodule ore and for obtaining aqueous solution of mixtures of the halides of the metal values from the ore, see co-pending U.S. Pat. Application, Ser. No. 247,692, and German Specification No. 2,126,175.

Generally, temperature is not an important parameter in carrying out the process of the present invention. The separation and stripping procedures can be carried out at any temperature below the boiling point of the various reagents and preferably at substantially ambient temperatures, or at the temperature at which the aqueous solution is obtained from the preceding step in the refining procedure.

The nickel-cobalt separation procedures of this invention can be applied to pregnant aqueous solutions which are derived from the leaching of various nickel and cobalt-containing ores, as well as from other sources, e.g. spent electroplating solutions and spent stainless steel acid pickling liquors from which it is desired to scavenge the nickel and cobalt values.

Referring to the drawings.

Figure 1:
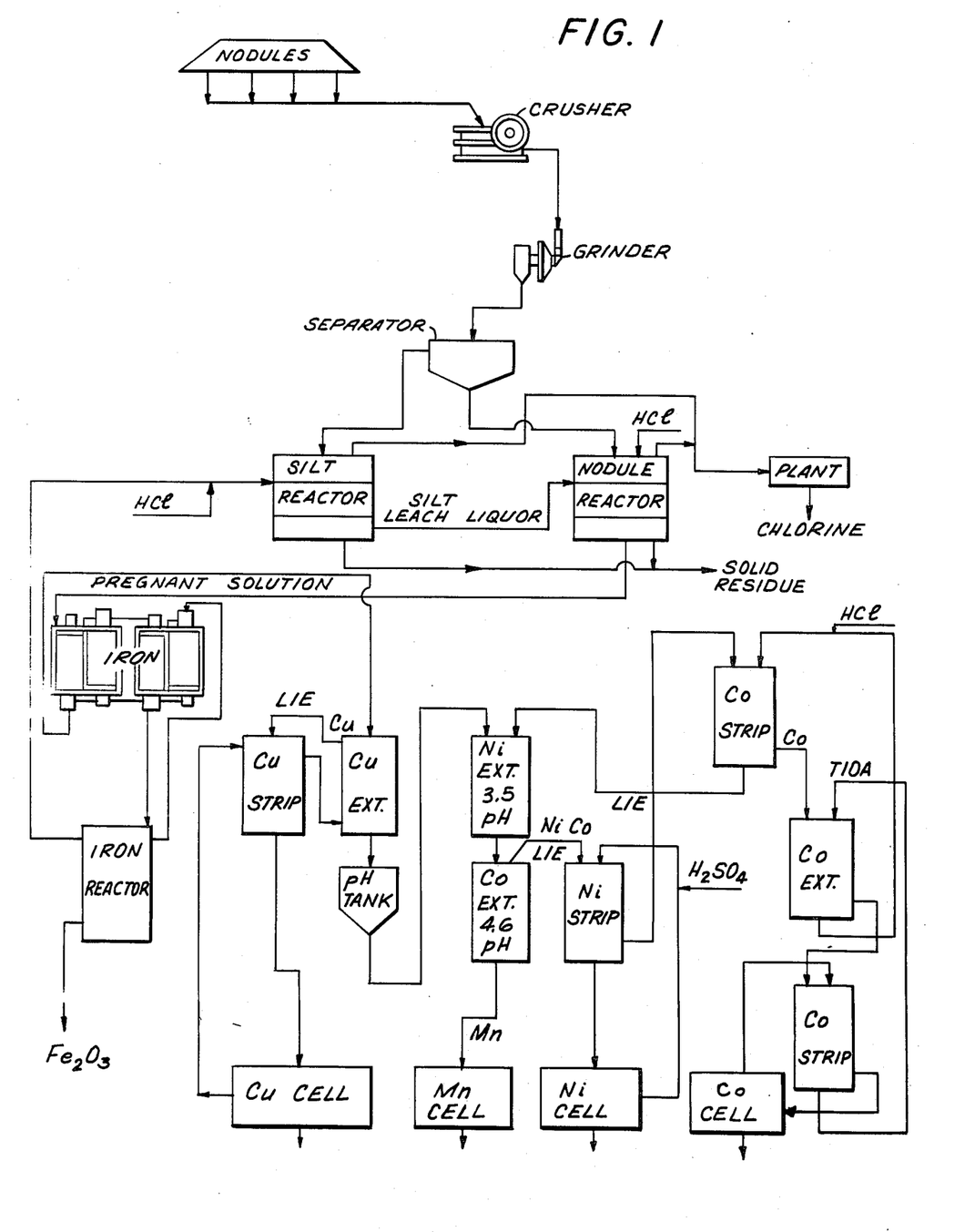
FIG. 1 is a schematic flow diagram of the preferred procedure in accordance with the present invention.

Referring to FIG. 1, ocean floor nodule ore is reacted with an aqueous solution of a hydrogen halide. A pregnant aqueous solution is separated from the reacted ore and the metal values are then individually separated from the aqueous solution. The nickel and cobalt are separated in accordance with the process of the present invention.

The following examples describe preferred embodiments of the present invention, but are exemplary and not exclusive of the scope of this invention.

EXAMPLE I

Ocean floor nodule ore was obtained having the following composition:

| COMPONENTS | PERCENT BY WEIGHT |
|---|---|
| Manganese | 27.7 |
| Iron | 6.03 |
| Nickel | 1.30 |
| Copper | 1.06 |
| Cobalt | 0.26 |
| Other Metals | Minor |

Referring to FIG. 1, the ore was ground to an average particle size of less than 35 mesh. The ground ore was treated in a hydroclassifier to separate fine silt particles, as overflow. The overflow nodule particles were then passed through a 3-stage leaching-reactor system, countercurrent to an aqueous solution of hydrogen chloride, fed at an initial concentration of hydrogen ion of 11 Normal. The overflow solution from the final stage, plus additional, anhydrous hydrogen chloride, was fed to a 5-stage leaching-reactor system in which the solution flowed countercurrent to the underflow nodule particles, the overflow solution from the final stage was the pregnant aqueous solution comprising manganese chloride, ferric chloride, cobalt chloride, nickel chloride and copper chloride having a pH of 1 which is next treated to remove iron chloride from the solution.

The pregnant aqueous solution is passed through 4 mixer-settler stages, countercurrent to an organic solution comprising 20% by volume N-lauryl-N-(1,1-dimethyhexyl)-amine, i.e., having the formula 20% by volume isodecanol and kerosene solvent, at an aqueous-to-organic ratio of 1:2, by volume.

The organic extract containing $FeCl_3$ is stripped with water, having a pH of 2, in a countercurrent, 3-stage mixer-settler system at an organic-to-aqueous ratio of 2:1 by volume. The aqueous stripping solution of $FeCl_3$ is then passed to an $FeCl_3$ reactor, where the water is evaporated and the $FeCl_3$ hydrolyzed by reaction with water at a temperature of about 200°C to form HCl and Fe$_2$O$_3$. The HCl produced is cycled to the silt reactor.

The aqueous raffinate from the FeCl$_3$ extraction has the following composition:

| Metal Value | Composition (g/l-of metal) |
| --- | --- |
| Mn | 100 |
| Cu | 3.84 |
| Co | 0.92 |
| Ni | 4.73 |
| Other Metals | Trace |

The pH of the FeCl$_3$ raffinate is adjusted to about 2, generally 1.5 to 2.5. The raffinate is extracted with an extracting medium comprising 10% by volume 7-[3-(5,5,7,7-tetramethyl-1-octenyl)]-8-hydroxyquinoline, 20% by volume isodecanol in Napoleum hydrocarbon solvent, in a 4-stage, countercurrent mixer-settler system at a volume ratio of organic-to-aqueous phases of 2:1 to remove copper. The organic extract phase is stripped with the sulfuric acid solution generated in an aqueous copper sulfate electrolysis operation in a countercurrent, 3-stage mixer-settler system. The regenerated extracting medium is recycled and contacted with additional FeCl$_3$ raffinate.

The pH of the copper raffinate is adjusted to a pH of about 3.5 and then contacted with another sample of the same organic extracting medium as above, in 3 stages, countercurrently. After substantially all of the nickel is removed from the aqueous phase, the pH of the aqueous phase is increased by the addition of 2N caustic soda solution to about 4.6 and the extraction continued until the cobalt is extracted. During both extractions caustic soda solution is added continuously to maintain the required pH.

If the extraction is carried out at a pH of about 4.6, the nickel and cobalt can be extracted in a single system in the ratios at which they are present in the solution. This pH value can be obtained from the graph of FIG. 2, obtained from the data in Table I, above. The pH during the extraction is maintained by the addition of caustic soda at the desired value.

The final organic extract phase, containing substantially all of the nickel and cobalt is first selectively stripped of the nickel using the electrolyte solution from a nickel aqueous electrolysis cell to which has been added sufficient HCl to replace the nickel in the hydroxyquinoline. The organic extract phase and stripping liquid are passed countercurrently through a 3-stage mixer-settler system. Substantially no cobalt is stripped out.

Cobalt is extracted from the extract phase with an aqueous solution of 20% by weight HCl in a 4-stage countercurrent system. The cobalt is re-extracted from the strong acid solution using 10% by volume triisooctylamine solution in an aromatic petroleum solvent. The cobalt is then stripped from the amine solution using the electrolyte from a cobalt aqueous electrolysis cell.

In the above procedure, the pH during extraction is maintained constant or raised by the addition of caustic as the basic reagent.

Solutions of salts other than halides can be derived from ocean floor nodules by various procedures. For example, sulfate solutions of the metal values found in nodules can be obtained by the salt forming-reduction procedure defined in co-pending application Ser. No. 40,486, filed May 26, 1970, commonly assigned.

EXAMPLE 2

The procedure of Example 1 is repeated but a 20% solution of an alpha-hydroxyoxime, 19-hydroxyhexatriaconta-9, 28-dien-18-oxime (commonly referred to as LIX-63) is used. Substantially the same separation was achieved as when utilizing the 8-hydroxyquinoline.

In both of the above Examples 1 and 2, chlorine gas is generated from the reaction of HCl with the ore. The chlorine is removed overhead from each stage and can be collected and stored, or packaged.

The patentable embodiments of this invention which are claimed are as follows:

1. A process for the separation of individual metal ions from a pregnant aqueous solution of metal salts, comprising the salts of cobalt and nickel, by extraction from an aqueous solution, followed by selective stripping, the process comprising: (1) contacting the pregnant aqueous solution with an organic solution of a liquid ion exchange agent, the agent being selected from the group consisting of alpha-hydroxyoximes and hydrocarbon-substituted-8-hydroxyquinolines, to extract both nickel and cobalt from the aqueous solution while maintaining the pH within a desired range of from about 3 to about 7 until the aqueous solution is substantially depleted in nickel and cobalt, thus forming a liquid organic extract solution containing dissolved nickel and cobalt values and an aqueous raffinate substantially depleted in nickel and cobalt; (2) selectively stripping the nickel value from the organic extract solution with an acidic aqueous solution of a mineral acid, which substantially does not strip cobalt, to form an organic phase substantially depleted of nickel and an aqueous phase containing a nickel salt; and (3) stripping the cobalt value from the organic phase using an aqueous acid solution containing a hydrogen ion and a halide ion concentration of at least 6 Normal each so as to strip the cobalt from the extract phase so as to form a regenerated extract medium substantially depleted in nickel and cobalt values and a strongly acidic aqueous phase containing the cobalt value.

2. The procedure in accordance with claim 1, wherein the pH of the pregnant solution is maintained in the range of from about 3 to about 6 during the extraction of nickel and cobalt.

3. The procedure in accordance with claim 2, wherein the pH of the pregnant aqueous solution is maintained in the range of from about 3.5 to about 4.5 during the extraction of nickel and cobalt.

4. The process of claim 1, wherein the solvent is a hydrocarbon liquid.

5. The process of claim 1, wherein the strongly acidic aqueous solution comprising at least about 20% by weight hydrogen halide.

6. The process of claim 5, wherein the hydrogen halide is HCl.

7. The process of claim 1, wherein the extracting agent is a hydrocarbon substituted 8-hydroxyquinoline.

8. The process of claim 1, wherein the extracting agent is an alpha-hydroxyoxime.

9. The process of claim 1, wherein the nickel is stripped from the extract with an aqueous solution having a concentration of from about 0.1 to about 1 Normal hydrogen ion.

10. A process in accordance with claim 1, comprising, in addition, contacting the strongly acidic aqueous phase containing the cobalt value with an extracting medium comprising an extracting agent capable of extracting cobalt value from the strongly acidic aqueous solution and from which the cobalt can be stripped by a weakly acidic solution.

11. The process of claim 10, wherein the strong acidic aqueous phase is contacted with a solution of an organic amine to form a cobalt halid-amine complex and, wherein the resulting amine complex is contacted with a slightly acidic aqueous solution to strip the cobalt halide from the amine to form an aqueous solution of cobalt halide and a substantially cobalt-free amine solution.

12. The process in accordance with claim 11, wherein the organic amine is a trialkyl amine.

13. The process of claim 1, wherein the salts of nickel and cobalt are halides.

14. The process of claim 1, wherein the salts of nickel and cobalt are chlorides.

15. A process in accordance with claim 1, wherein the liquid ion exchange agent is a hydrocarbon-substituted-8-hydroxyquinoline, substituted in the 7-position with a beta-alkenyl group or an alkyl benzyl group.

16. A process in accordance with claim 1, wherein the liquid ion exchange agent is an alpha-hydroxyoxime wherein in the formula:

R and R' are selected from the group consisting of unsaturated hydrocarbon and branched chain alkyl groups containing from about 6 to about 20 carbon atoms and R'' is selected from the group consisting of hydrogen and unsaturated hydrocarbon and branched chain alkyl groups containing from about 6 to about 20 carbon atoms.

17. A process in accordance with claim 15, wherein the salts of nickel and cobalt are chloride salts.

18. The process of claim 1, wherein the nickel is stripped from the extract with an aqueous solution having a concentration of from about 0.1 to about 3 Normal hydrogen ion.

19. A process for obtaining, individually, the nickel and cobalt values from ocean floor nodule ore, the ore comprising, as major components, the oxides of manganese and of iron, and as secondary components, compounds of copper, cobalt and nickel, the process comprising the steps of (a) reacting the ocean floor nodule ore with a hydrogen halide to form a mixture comprising the corresponding water-soluble metal halide salts of divalent manganese, trivalent iron, copper, nickel and cobalt; (b) separating the iron from the remaining salts and forming an aqueous solution of the water-soluble metal salts; (c) adjusting the pH of the aqueous solution to a value of not greater than about 2.5; (d) contacting the aqueous solution with a liquid ion exchange extracting medium immiscible with water, the medium comprising a member selected from the group consisting of alpha-hydroxy oximes, hydrocarbon-substituted-8-hydroxy-quinolines, organic phosphoric acid compounds, and napthenic acids to extract copper selectively from the solution, until the aqueous solution is substantially depleted in copper, thus forming an organic extract containing the copper value and a first aqueous raffinate solution substantially depleted in copper; (e) contacting the first raffinate with an organic solution of a liquid ion exchange agent, the agent being selected from the group consisting of alpha-hydroxy oximes and hydrocarbon-substituted-8-hydroxyquinolines, to extract nickel and cobalt while maintaining the pH within the desired range of from about 3 to about 6 until the aqueous solution is substantially depleted in nickel and cobalt, thus forming a liquid organic extract solution containing dissolved nickel and cobalt values and an aqueous raffinate containing manganese compound and substantially depleted in nickel and cobalt; (f) selectively stripping the nickel value from the organic extract solution with an acidic aqueous sollution of a mineral acid, having a concentration of hydrogen ion of from about 0.1 to about 3N, which substantially does not strip cobalt, to form an organic phase substantially depleted of nickel and an aqueous phase containing a nickel salt; and (g) stripping the cobalt value from the organic phase using an aqueous acid solution containing a hydrogen ion and a halide ion concentration of at least 6N each to form an organic phase substantially depleted in nickel and cobalt values and strongly acidic aqueous phase containing a cobalt halide.

20. The process of claim 19, wherein the ore is reacted with an aqueous solution of HCl to form an aqueous leach solution comprising iron chloride, manganese chloride, nickel chloride, cobalt chloride and copper chloride, and wherein the iron chloride is extracted therefrom by contacting with a liquid extracting agent selective to extract iron chloride to form an iron-free pregnant aqueous solution.

21. The process of claim 19, wherein the highly acid aqueous phase is contacted with a solution of an organic amine to form a cobalt halide amine complex and wherein the ammine is contacted with an aqueous solution to strip the cobalt halide from the amine to form a less acidic aqueous solution of cobalt halide and a substantially cobalt-free amine.

22. A process for the separation of individual metal ions from a pregnant aqueous solution of metals salts, consisting of salts of cobalt and nickel, by extraction from an aqueous solution, followed by selective stripping, the process comprising: (1) contacting the pregnant aqueous solution with an organic solution of a liquid ion exchange agent, the agent being selected from the group consisting of alpha-hydroxyoximes and hydrocarbon-substituted-8-hydroxyquinolines, to extract both nickel and cobalt from the aqueous solution while maintaining the pH within a desired range of from about 3 to about 7 until the aqueous solution is substantially depleted in nickel and cobalt, thus forming a liquid organic extract solution containing dissolved nickel and cobalt values and an aqueous raffinate substantially depleted in nickel and cobalt; (2) selectively stripping the nickel value from the organic extract solution with an acidic aqueous solution of a mineral acid, which substantially does not strip cobalt, to form an organic phase substantially depleted of nickel and an aqueous phase containing a nickel salt; and (3) stripping the cobalt value from the organic phase using an aqueous acid solution containing a hydrogen ion and a halide ion concentration of at least 6 Normal each so as to strip the cobalt from the extract phase so as to form a regenerated extract medium substantially depleted in nickel and cobalt values and a strongly acidic aqueous phase containing the cobalt value.

23. A process for the separation of nickel value from cobalt value from a pregnant aqueous solution of metal salts, comprising the salts of cobalt and nickel, by extraction from an aqueous solution, followed by selective stripping, the process comprising: (1) contacting the pregnant aqueous solution with an organic solution of a liquid ion exchange agent, the agent being selected from the group consisting of alpha-hydroxyoximes and hydrocarbon-substituted-8-hydroxyquinolines, to extract both nickel and cobalt from the aqueous solution while maintaining the pH within a desired range of from about 3 to about 7 until the aqueous solution is substantially depleted in nickel and cobalt, thus forming a liquid organic extract solution containing dissolved nickel and cobalt values and an aqueous raffinate substantially depleted in nickel and cobalt; (2) selectively stripping the nickel value from the organic extract solution with an acidic aqueous solution of a mineral acid, which substantially does not strip cobalt, to form an organic phase substantially depleted of nickel and an aqueous phase containing a nickel salt, and substantially free from cobalt.

24. A process in accordance with claim 23, wherein the nickel is stripped from the extract with an aqueous solution having a concentration of hydrogen ion of from about 0.1 to about 3N.

25. A process in accordance with claim 24, wherein the salts of cobalt and nickel are halides.

* * * * *

UNITED STATES PATENT OFFICE
CERTIFICATE OF CORRECTION

PATENT NO. : 3,894,139
DATED : July 8, 1975
INVENTOR(S) : PAUL H. CARDWELL; WILLIAM S. KANE and JAMES A. OLANDER It is certified that error appears in the above-identified patent and that said Letters Patent are hereby corrected as shown below:

Column 12, line 53, (Claim 5, line 2), correct " comprising " to read -- comprises --.

Column 13, line 7, Claim 11, line 3), correct " halid-amine " to read -- halide-amine --.

Column 14, line 16, (Claim 19, line 37), correct " sollution " to read -- solution --.

Column 14, line 37, (Claim 21, line 3), correct " cobalt halide amine " to read -- cobalt halide-amine --.

Column 14, line 38, (Claim 21, line 4), correct " ammine " to read -- amine --.

Column 14, line 43, (Claim 22, line 2), correct " metals" to read -- metal --.

Signed and Sealed this thirtieth Day of March 1976

[SEAL]

Attest:

RUTH C. MASON
Attesting Officer

C. MARSHALL DANN
Commissioner of Patents and Trademarks